(12) United States Patent
Loncar et al.

(10) Patent No.: US 11,474,282 B2
(45) Date of Patent: Oct. 18, 2022

(54) WAVELENGTH SELECTIVE OPTICAL NANOSTRUCTURES FABRICATED ON THE SURFACE OF BULK HOMOGENOUS SUBSTRATES

(71) Applicant: President and Fellows of Harvard College, Cambridge, MA (US)

(72) Inventors: Marko Loncar, Cambridge, MA (US); Haig Avedis Atikian, Somerville, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 103 days.

(21) Appl. No.: 15/759,909

(22) PCT Filed: Sep. 13, 2016

(86) PCT No.: PCT/US2016/051436
§ 371 (c)(1),
(2) Date: Mar. 14, 2018

(87) PCT Pub. No.: WO2017/048671
PCT Pub. Date: Mar. 23, 2017

(65) Prior Publication Data
US 2018/0252844 A1    Sep. 6, 2018

Related U.S. Application Data

(60) Provisional application No. 62/218,786, filed on Sep. 15, 2015.

(51) Int. Cl.
*G02B 1/12* (2006.01)
*B82Y 30/00* (2011.01)
(Continued)

(52) U.S. Cl.
CPC ............. *G02B 1/12* (2013.01); *B82Y 20/00* (2013.01); *B82Y 30/00* (2013.01); *B82Y 40/00* (2013.01); *G02B 2207/101* (2013.01)

(58) Field of Classification Search
CPC ......... B82Y 20/00; B82Y 30/00; B82Y 40/00; G02B 1/12; G02B 2207/101
See application file for complete search history.

(56) References Cited

FOREIGN PATENT DOCUMENTS

| CN | 101041414 | 9/2007 | |
|---|---|---|---|
| WO | WO-2014201407 A1 * | 12/2014 | ......... H01L 21/3086 |

OTHER PUBLICATIONS

OED Entries for "hourglass" and "obconical"; retrieved Jan. 30, 2021 (Year: 2021).*

(Continued)

*Primary Examiner* — Frank J Vineis
*Assistant Examiner* — Laura B Figg
(74) *Attorney, Agent, or Firm* — Peter A. Nieves; Sheehan Phinney Bass & Green PA

(57) ABSTRACT

An optical structure having enhanced optical properties, the optical structure comprising a bulk homogenous substrate that is surface modified so as to provide the enhanced optical properties. Surface modification of the bulk homogenous substrate can comprise removing portions of the bulk homogenous substrate to provide nanostructure elements at the surface, thereby providing an improved optical structure formed of a homogenous material. Methods for enhancing the optical properties of a bulk homogenous substrate include surface modifying the bulk homogenous substrate to provide an optical structure formed of a homogenous material, the optical structure having enhanced optical properties compared to the unmodified bulk homogenous material.

13 Claims, 9 Drawing Sheets

(51) Int. Cl.
    *B82Y 20/00*      (2011.01)
    *B82Y 40/00*      (2011.01)

(56) References Cited

OTHER PUBLICATIONS

Burak, et al; Free-Standing Mechanical and Photonic Nanostructures in Single-Crystal Diamond; 2012 American Chemical Society; Nano Letters 2012, 12, 6084-6089.
Tian et al; Morphology Modulating the Wettability of a Diamond Film, Langmuir 2014, 30,12647-12653.

* cited by examiner

FIG. 1A
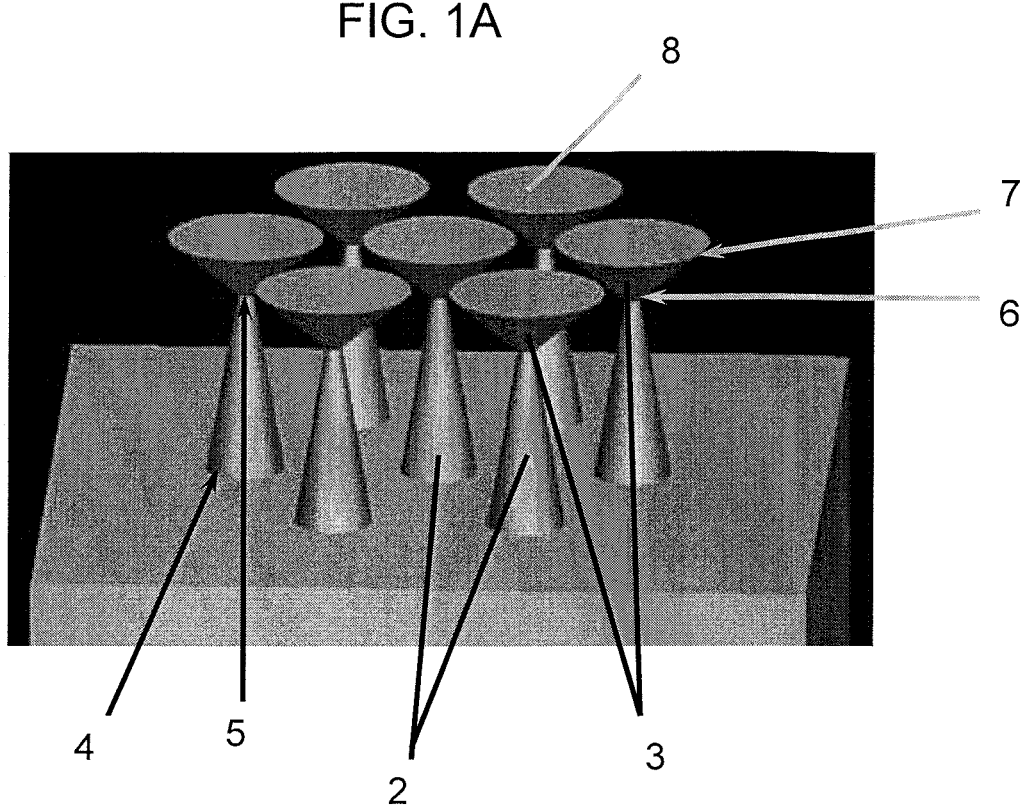
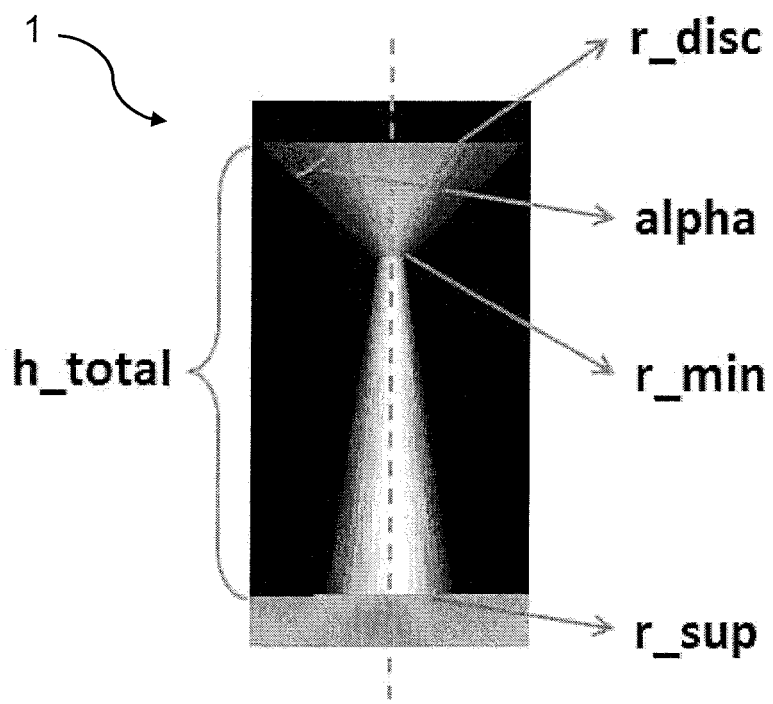
FIG. 1B

FIG. 2A
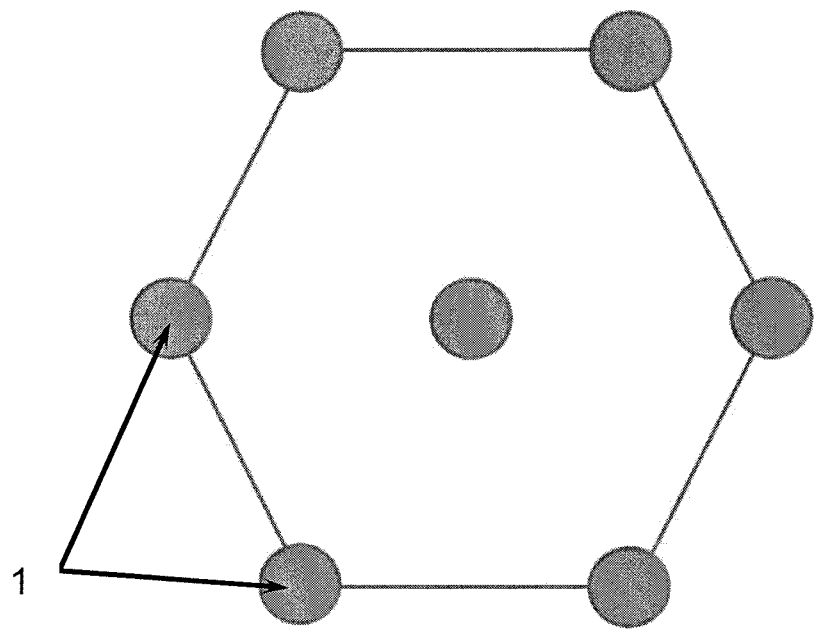
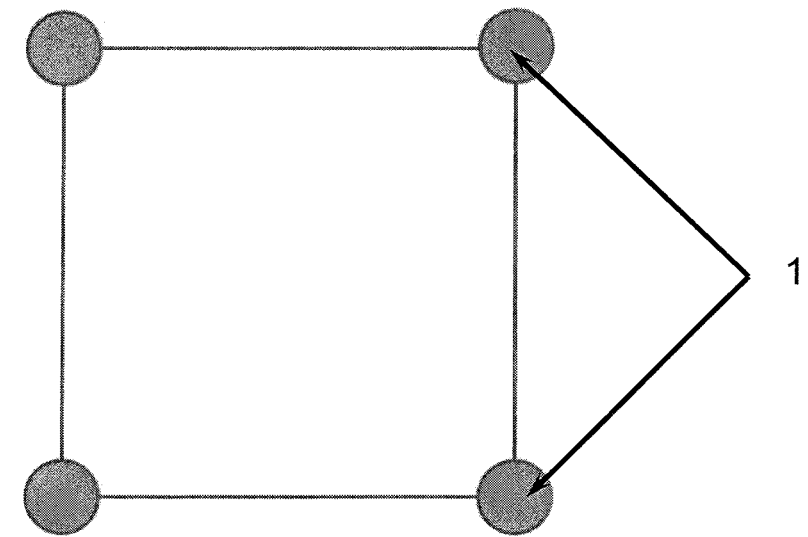
FIG. 2B (a)

(b)

FIG. 5A
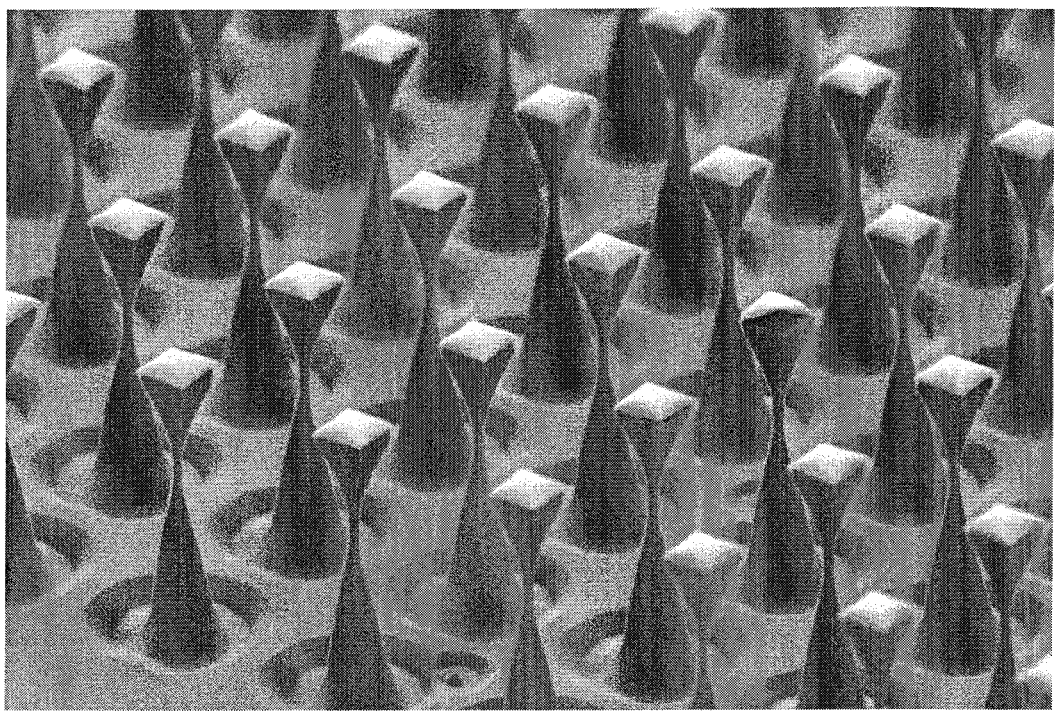
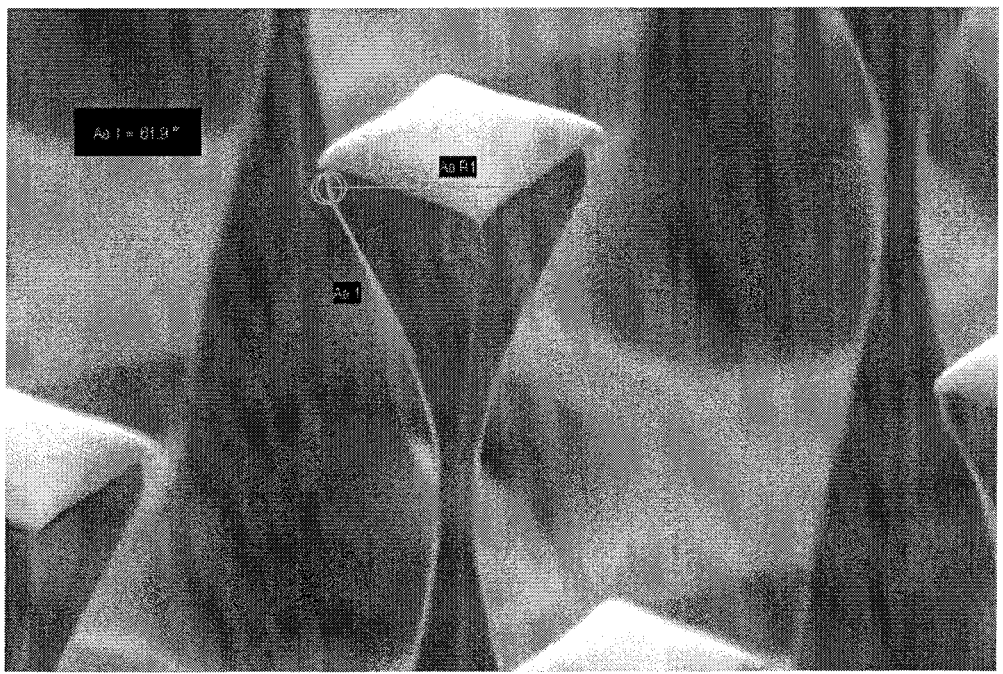
FIG. 5B

WAVELENGTH SELECTIVE OPTICAL NANOSTRUCTURES FABRICATED ON THE SURFACE OF BULK HOMOGENOUS SUBSTRATES

CROSS-REFERENCE TO RELATED APPLICATIONS

This application claims the benefit of U.S. Provisional Patent Application Ser. No. 62/218,786, filed Sep. 15, 2015, entitled "Wavelength Selective Optical Nanostructures Fabricated on the Surface of Bulk Homogenous Substrates" which is incorporated by reference herein in its entirety.

FIELD OF THE INVENTION

The present invention generally relates to optical structures having enhanced optical properties, and more particularly to optical structures comprising a bulk homogenous substrate, wherein the surface of the bulk homogeneous substrate is surface modified so as to provide the enhanced reflective surface properties. Methods for enhancing the optical properties of a bulk homogenous substrate are further provided.

BACKGROUND

In the vast field of optics and photonics, many devices and components have optical coatings to engineer the transmission or reflection properties for particular wavelengths or polarizations of interest. Common optical coatings include anti-reflection (AR), high reflectivity (mirror), dichroic beamsplitters, and filters.

Typically when one thinks of colors emanating from objects, they occur due to dyes, pigments or metals that absorb light of a certain wavelength, and reflect all other wavelengths in the spectrum, giving an object the observable color it has. Recently, there has been a lot of interest in structural color, where color is generated without the use of dyes or pigments. Structural color is principally an interference effect where light interacts on the sub-wavelength scale with a structured material. Many examples of these can be found in nature, along with structures fabricated by man including multilayer interference structures, or photonic crystals and metamaterials.

Typical optical coatings found in industrial applications consist of a combination of thin film layers of varying refractive index to generate an interference effect at the desired wavelengths to modify the transmission or reflection properties of an optical component. The characteristics and performance of such multilayer coatings are dependent on the number of layers, the thickness of each layer, and the refractive index variation amongst the layers. By controlling these parameters, one can design for a wavelength sensitive optical element in the desired location in the spectrum.

As optical technology advances, many industrial applications have come to rely on high-power laser sources. Standard optical coatings have operational limits when irradiated by high intensity laser fields. Imperfections in the coating layers or at the interfaces between these layers form sites where laser energy can be absorbed. At very high laser powers, these sites generate a tremendous amount of heat, causing local melting or extreme thermal stress in the coating film. This degrades the optical performance of the device. Further, it is extremely difficult to select materials with appropriate refractive indices needed to fulfill the required interference conditions, wherein the materials also possess optimal thermal properties necessary for use with high power laser sources. As such, these constraints often result in the limitation of the high laser power handling capabilities of the materials.

While many optical coatings have been developed which are capable of providing desired optical properties, such coatings and techniques are deficient and have limitations as noted above. It would, thus, be desirable to provide a material and method of providing enhanced optical properties without requiring the use of a plurality of layers of materials to achieve the desired enhanced optical properties. It would further be desirable to provide a material that alone is capable of possessing all of the requisite optical and thermal properties for any given application, without requiring a combination of materials.

SUMMARY OF INVENTION

Aspects of the present invention are directed to optical structures that are formed of a bulk homogenous substrate that is modified so as to provide desired enhanced optical properties. In particular, aspects of the present invention are directed to such optical structures wherein the bulk homogenous substrate is modified at its surface so as to provide the desired enhanced optical properties. The modification of the bulk homogenous substrate is such that the resulting optical structure, after modification, remains a homogenous structure.

As referred to herein, a "homogenous" substrate, material or structure refers to a substrate, material or structure that contains a single type of material as well as a single layer of the material. In other words, multiple layers of different materials are not included in such "homogenous" substrates, materials or structures.

According to one aspect, an optical structure is provided having one or more enhanced optical properties. The optical structure comprises a bulk homogenous substrate material and a plurality of nanostructure elements provided within the bulk homogenous substrate material. In particular, the plurality of nanostructure elements comprise a base portion extending from a surface of the bulk homogenous substrate material, the base portion having a bottom end and an upper end; and a top portion extending from the upper end of the base portion, the top portion having a bottom end and an upper end, and an upper surface at the upper end, the bottom end of the top portion extending from the upper end of the base portion. According to embodiments of the invention, the bulk homogenous substrate material and the plurality of nanostructure elements are formed from a single layer of a homogenous material. Further, the nanostructure elements provide the optical structure with one or more optical properties that are improved or enhanced as compared with the one or more optical properties of the bulk homogenous substrate material without the nanostructure elements.

In some embodiments, the optical structure has one or more enhanced optical properties including at least high reflectivity. In some embodiments, the base portion has a configuration that (a) tapers from a wider bottom end to a narrower upper end or (b) has a rod-like configuration, with a substantially constant diameter from the bottom end to the upper end, and the top portion has a configuration that expands from a narrower bottom end to a wider upper end, thereby providing an upper surface with increased surface area and, thus, increased reflectivity. In some embodiments, the nanostructure elements comprise a dual cone structure, wherein the base portion is in the shape of a cone with a circular cross section that decreases in size from the bottom end to the top end of the base portion, and wherein the top portion is in the shape of an inverted cone with a circular cross section that increases in size from the bottom end to the top end. In some embodiments, the nanostructure elements comprise a dual inverted structure, wherein the base portion is in the shape of a cone with a polygonal shaped cross section that decreases in size from the bottom end to the top end of the base portion, and wherein the top portion is in the shape of an inverted cone with a polygonal shaped cross section that increases in size from the bottom end to the top end. In some embodiments, the bulk homogenous substrate material is diamond.

According to another aspect, a method for providing an optical structure from a bulk homogenous substrate, wherein the optical structure having one or more enhanced optical properties as compared to the one or more optical properties of the bulk homogenous substrate, is provided. The method comprises surface modifying the bulk homogenous substrate to provide a plurality of nanostructure elements in the bulk homogenous substrate, wherein the optical structure is formed completely of a single layer of the bulk homogenous substrate.

In some embodiments, surface modifying the bulk homogenous substrate comprises removing portions of the bulk homogenous substrate to provide the plurality of nanostructure elements extending from a surface of the bulk homogenous substrate. In some embodiments, removing portions of the bulk homogenous substrate comprises performing ion beam etching. In some embodiments, the nanostructure elements comprise a base portion extending from a surface of the bulk homogenous substrate material, the base portion having a bottom end and an upper end; and a top portion extending from the upper end of the base portion, the top portion having a bottom end and an upper end, and an upper surface at the upper end, the bottom end of the top portion extending from the upper end of the base portion. In some embodiments, the base portion has a configuration that (a) tapers from a wider bottom end to a narrower upper end or (b) is rod-like, with a substantially constant diameter from the bottom end to the upper end, and the top portion has a configuration that expands from a narrower bottom end to a wider upper end, thereby providing an upper surface with increased surface area and, thus, increased reflectivity. In some embodiments, the nanostructure elements comprise a dual cone structure, wherein the base portion is in the shape of a cone with a circular cross section that decreases in size from the bottom end to the top end of the base portion, and wherein the top portion is in the shape of an inverted cone with a circular cross section that increases in size from the bottom end to the top end. In some embodiments, the nanostructure elements comprise a dual inverted structure, wherein the base portion is in the shape of a cone with a polygonal shaped cross section that decreases in size from the bottom end to the top end of the base portion, and wherein the top portion is in the shape of an inverted cone with a polygonal shaped cross section that increases in size from the bottom end to the top end. In some embodiments, the bulk homogenous substrate is formed of diamond.

Other aspects, embodiments and advantages of the present invention will become readily apparent to those skilled in the art are discussed below. As will be realized, the present invention is capable of other and different embodiments without departing from the present invention. Thus the following description as well as any drawings appended hereto shall be regarded as being illustrative in nature and not restrictive.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principals of the invention. The components in the drawings are not necessarily to scale, emphasis instead being placed upon clearly illustrating the principles of the present invention. In the drawings, each like component is referenced by a like numeral. For purposes of clarity, every component may not be labeled in every drawing. In the drawings:

FIGS. 1A-1B illustrates a surface modification structure of the bulk homogeneous substrate in the form of a hexagonal unit cell of nanostructures in accordance with one embodiment of the present invention, wherein FIG. 1A depicts a portion of the surface modification with a plurality of arranged hexagonal unit cells, and FIG. 1B depicts a single nanostructure element (here, a single dual-inverted cone structure).

FIGS. 2A-2B illustrate two configurations in which the single nanostructure elements can be arranged into unit cells on the surface of the optical structures in accordance with embodiments of the present invention, wherein FIG. 2A depicts a plurality of nanostructure elements arranged into a unit cell having a hexagonal lattice structure and FIG. 2B depicts a plurality of single nanostructure elements arranged into a unit cell having a square lattice structure.

FIGS. 5A-5B show a square lattice diamond reflective surface with square top inverted cone features in accordance with an embodiment of the present invention, wherein FIG. 5A is an SEM of the square lattice diamond reflective surface with square top inverted cone features before the removal of the titanium mask, and FIG. 5B is an enlarged view of the inverted cone feature illustrating the geometries and angles etched into the substrate material.

DETAILED DESCRIPTION OF THE INVENTION

Figure 3A:
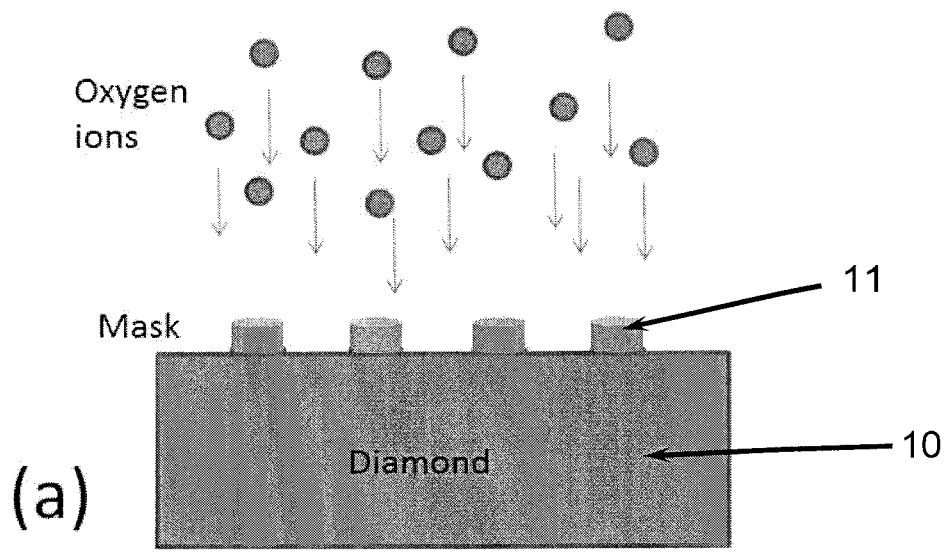
FIGS. 3A-3D illustrate schematically a method of providing the surface modified homogenous optical structure using an etching process in accordance with an embodiment of the present invention.

According to the present invention, an optical structure is provided having one or more enhanced optical properties. In general, the optical structure is formed from a bulk homogenous substrate, wherein the bulk homogenous substrate is modified so as to provide the bulk homogenous substrate with one or more enhanced optical properties.

According to various embodiments, the bulk homogenous substrate is modified by removing portions of the bulk homogenous substrate so as to provide a particular surface structure that enhances one or more optical properties. Thus, contrary to prior methods in which layers and coatings are provided on top of a material so as to provide an optical structure which achieves desired optical properties, the present invention utilizes a single homogenous substrate material and modifies the structure of the homogenous substrate material so as to achieve the desired optical properties. As such, the end product of the present invention, i.e., the optical structure, is fabricated of the single homogenous substrate material without any additional layers or coatings added thereto.

The optical structure provided by the present invention and the method of providing the optical structure of the present invention can be applied to any number of applications in which an optical structure or optical material is required possessing particular optical properties. In particular, this can be accomplished by the use of an appropriate bulk homogenous substrate material possessing certain base properties when unmodified, and the use of surface modification techniques that will provide the bulk substrate material with the desired enhanced optical properties. Some examples of enhanced optical properties that the present optical structures can possess, and which can be achieved using the present methods include, but are not limited to, anti-reflection, high reflectivity, filtering of particular wavelengths, light separation (e.g., dichroic beamsplitting), and polarization optics.

According to a particular embodiment of the present invention, a bulk homogenous substrate material is provided which possesses excellent thermal conductivity properties, and the surface of the bulk homogenous substrate material is modified so as to increase the reflective properties of the bulk homogenous substrate. The resulting optical structure would be ideal for use with high power laser sources, which require a material that possesses both excellent thermal conductivity and high reflectance—two properties which are very difficult to simultaneously achieve to the necessary degree using conventional materials and methods so as to provide a structure suitable for use with high power laser sources. The remainder of the detailed description will focus on such highly thermally conductive and reflective materials, the associated methods and structures. However, it is to be understood by one skilled in the art that the detailed description below could be suitably modified so as to select any appropriate bulk substrate material having particular initial material properties, as well as appropriate surface modification, so that the end optical structure is provided with a combination of material properties and improved optical properties necessary for other target uses.

According to preferred embodiments, the bulk homogenous substrate is fabricated of diamond. Diamond exhibits many favorable material properties for optical applications. In particular, it has a relatively high refractive index (2.4), a wide bandgap (5.5 eV), and a large optical transmission range from the UV into the mid infrared. Further, diamond is particularly attractive as a material for high power lasers in the visible to mid infrared range due to its excellent transmission properties and astonishingly high thermal conductivity at room temperature (2200 W/mK), mechanical hardness, and chemical resistance. In light of diamond's extraordinary thermal properties, use of thin film coatings thereon to modify diamond's surface reflection properties is highly detrimental because the end product is then limited by the thermal properties of the added layers. Thus, according to embodiments of the present invention, a unique diamond surface geometry is provided by novel surface modification techniques to realize highly-reflective surfaces in bulk diamond substrates.

According to various embodiments, structures are provided within the surface of the bulk diamond substrate that provide excellent reflectivity. The general feature of such structures is that portions of the bulk diamond substrate are removed to provide upwardly extending nanostructure elements. These nanostructure elements can be in the form of column-like extensions, which may be relatively constant in cross section along their length, or which may taper along their lengths, wherein the upper portions of the extensions flare outwards so as to provide top surfaces having a relatively large surface area. The large surface area beneficially provides enhanced reflectivity.

An example of one such structure is depicted in FIGS. 1A-1B. As shown, a plurality of individual nanostructure elements 1 are arranged extending in a common direction (here, upwards), the individual nanostructure elements 1 each including a base portion 2 and top portion 3. It is noted that while a preferred embodiment includes nanostructure elements, it is possible to provide other embodiments wherein the individual elements are sized differently so as to not fall within the definition of a nanostructure. As shown, the base portion 2 can taper from a bottom end 4 to a top end 5. Alternatively, the base portion 2 can have a rod-like configuration, with a substantially constant diameter from the bottom end 4 to the top end 5. As further shown, the top portion 3 can taper from a bottom end 6 to a top end 7 so as to provide an upper surface 8 that has a large surface area. For example, as shown in FIGS. 1A-1B, the top portion 3 is provided with a large diameter upper surface 8 with a typical shape of an upside-down cone, supported underneath by a base portion 2 in the form of a thin cone that adiabatically increases in diameter from a top end 5 to a bottom end 4. As further referred to herein, the depicted structure will be referred to as a "dual-inverted cone structure", or more simply as a "dual cone structure" with the top portion referred to as an "inverted cone structure". The dual cone structure provides a structure in which the effective refractive index of the top portion 3 is high, while the narrowed tapered cone forming the base portion 2 has a relatively lower refractive index directly underneath the top portion 3, with the refractive index of the base portion 2 increasing until it reaches the bottom end 4 which has a high refractive index. If designed properly, such a modulation of refractive index provided through the design structure of the nanostructure elements can serve a similar role as the layers of alternating refractive index in typical thin film optical elements. As such, if the geometries and angles of the nanostructure elements are designed and fabricated correctly, it becomes possible to achieve a perfectly reflective surface from a homogenous substrate.

A more detailed view of an exemplary nanostructure element 1 in accordance with the dual cone structure is shown in FIG. 1B. According to embodiments of the invention, the dual cone structure can be designed with varying dimensions, including, for example, the total height (h_total) from the bottom end 4 to the top end 7, the radius (r_disc) of the upper surface 8, the angle of the inverted cone (alpha), the radius (r_min) of the inverted cone at the bottom end 6, and the radius (r_sup) of the base portion 2 at the bottom end 4.

As shown in FIG. 1A, according to some embodiments of the present invention, the surface geometry of the optical structure may be in a configuration such that pluralities of the nanostructure elements are arranged into unit cells, the unit cells provided in various lattice arrangements, such as the depicted hexagonal lattice arrangement. This is depicted in greater detail in the illustration shown in FIG. 2A. For example, as shown in FIGS. 2A-2B, each nanostructure element 1 is depicted by dots, which are illustrated as forming a hexagonal unit cell configuration (FIG. 2A) and a square lattice unit cell arrangement (FIG. 2B) at the surface from which they extend. As shown in FIGS. 2A-2B, each vertex of the polygons (shown as the circular portions) would be a position of one of the nanostructure elements. While a hexagonal lattice arrangement and a square lattice arrangement are depicted in the figures, the present invention is not limited to such arrangements. Rather, it is possible to provide unit cells in any desired configuration. Some examples include, but are not limited to, any variety of regular and irregular polygonal arrangements, such as a triangular lattice arrangement, a quadrilateral lattice arrangement, a pentagonal lattice arrangement, a heptagonal lattice arrangement, an octagonal lattice arrangement, etc., a circular lattice arrangement, an oval lattice arrangement, as well as arrangements wherein the nanostructure elements are provided in irregular or random positions (i.e., irregular or random unit cell structures).

According to aspects of the present invention, a method of fabricating an optical structure from a bulk homogenous substrate 10 is provided. In particular, according to methods of the present invention, portions of the bulk homogenous substrate 10 are removed so as to provide the bulk homogenous substrate 10 with a structure that increases one or more optical properties of the bulk homogenous substrate. Such modification is capable of providing a product (optical structure) that is formed of a single layer of homogenous material but possesses properties that are typically achievable by layering multiple materials having varying optical properties. For example, according to an exemplary embodiment of the invention, the present method is used to create a wavelength selective surface from a bulk homogenous material, particularly a bulk diamond material.

According to an exemplary method, an etching technique is used to remove the desired portions of the bulk homogenous substrate 10. Any conventional etching techniques can be utilized, including both dry and wet etching techniques. For example, one preferred method is depicted in FIGS. 3A-3D, which shows an ion beam etching method. Such an etching method can beneficially be utilized to create the angles and geometries desired, such as the dual cone configurations as depicted in FIGS. 1A-1B.

In particular, as shown in FIG. 3A, an etch mask 11 is placed on the surface of the homogenous diamond substrate 10 to define the locations of the nanostructure elements 1 that will be formed. In particular, the etch mask 11 can be placed so as to define the upper surface 8 of an inverted cone structure (or other desired structure), which provides the reflective surface of the optical structure. This mask 11 can be any conventional type of mask for use in ion beam etching, including, but not limited to, one or more metals such as titanium, aluminum, and chrome. In particular, the mask is one that is resistant to the plasma of reactive gases used in the ion beam process. Such plasmas of reactive gases can include, but are not limited to, fluorocarbons, oxygen, chlorine, boron trichloride, and sometimes with addition of nitrogen, argon, helium and other gases. According to an exemplary embodiment, the ion beam etching is carried out with an oxygen plasma. In addition to the above noted masks, oxides, such as $Al_2O_3$ and $SiO_2$ are good options for the etch mask 11. The etch mask 11 can be created by any conventional technique, including, but not limited to, a liftoff technique using a PMMA resist, and by transferring the etch pattern into the mask layer using PMMA or a hydrogen silsesquioxane ebeam resist (HSQ). When forming the etch mask 11, one critical criteria for the structure of the etch mask 11 is that it cannot be too thick. In particular, when etching the bulk homogenous substrate 10 at an angle in the ion mill, the height of the etching mask 11 cannot shadow adjacent features that need to be etched.

Figure 3B:
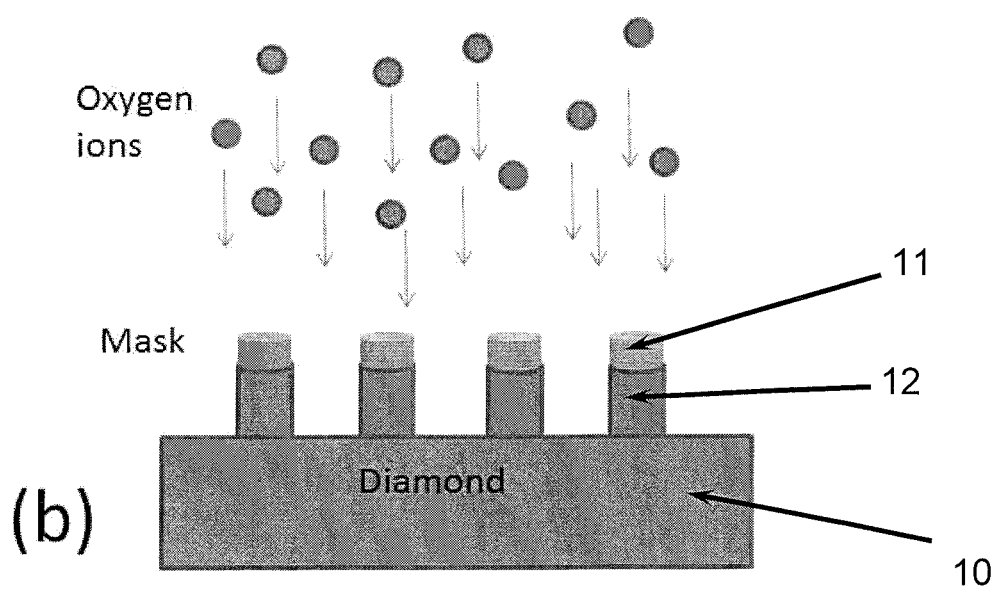

After the etch mask 11 is properly formed, the mask material is etched with the appropriate plasma chemistry. FIG. 3B illustrates a top down etch process performed in an RF ICP ion beam mill using oxygen gas. As shown, diamond pillars 12 are formed within the bulk diamond substrate 10, which will be further etched in subsequent steps to form the inverted cone structures (or other desired nanostructure element 1 structures).

Figure 3C:
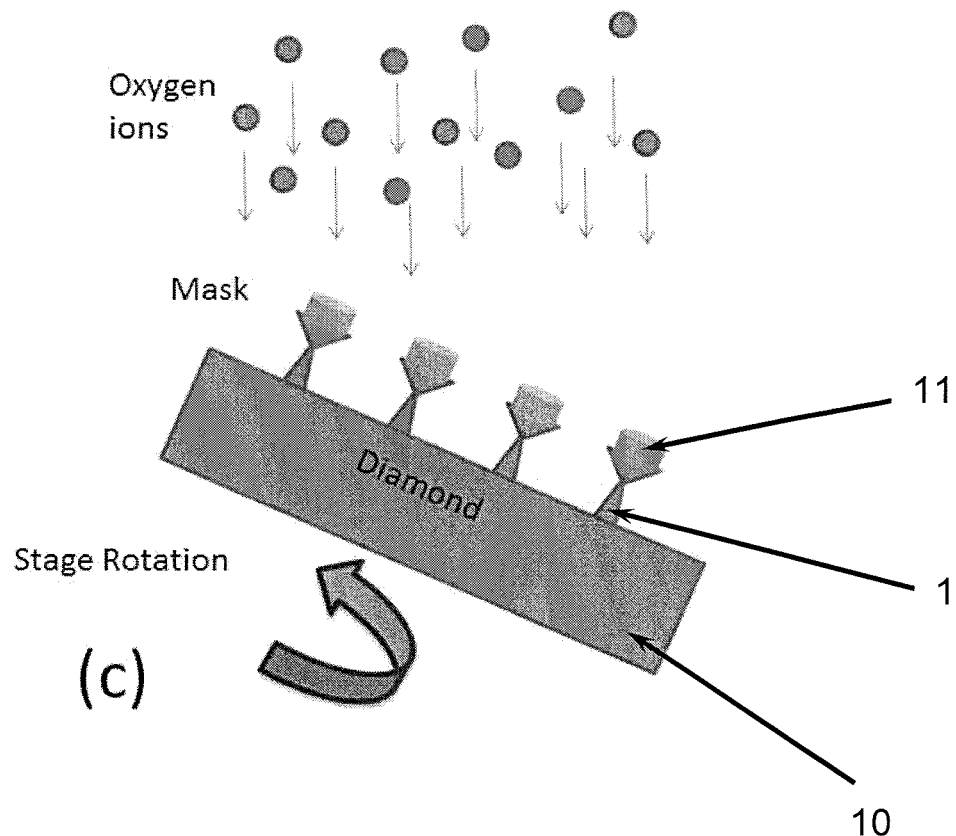

FIG. 3C illustrates the next etch step wherein the diamond substrate 10 is rotated in the RF ICP ion mill with oxygen gas plasma, such that an angled profile is provided in the diamond pillar 12 structures.

Figure 3D:
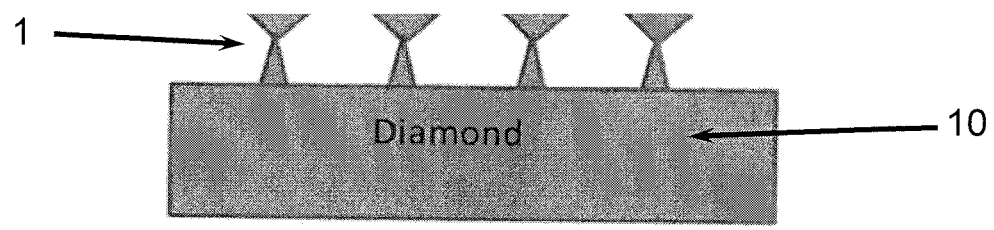

Finally, as depicted in FIG. 3D, the mask material is removed to provide the end optical structure.

According to this method, since the size of an RF ICP gun can be quite large (e.g., upwards of about 22 cm in diameter), this process is truly a wafer scale method which is capable of creating the nanostructure elements 1 uniformly across very large bulk homogenous substrates 10 (or, if desired, irregularly or randomly across the bulk homogenous substrate 10) to provide superior, all-diamond optical structures.

Figure 4:
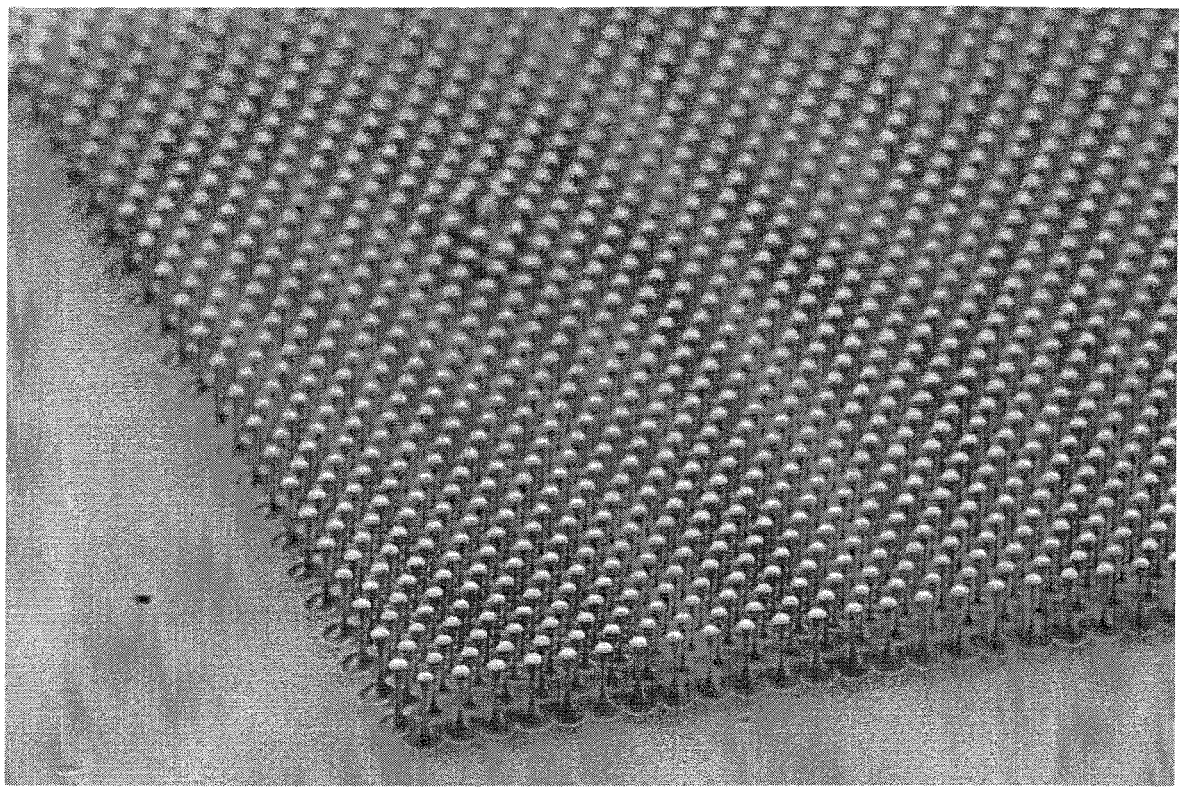
FIG. 4 is a scanning electron micrograph (SEM) of a hexagonal lattice diamond reflective surface with circular inverted cone features in accordance with an embodiment of the present invention.
Figure 6:
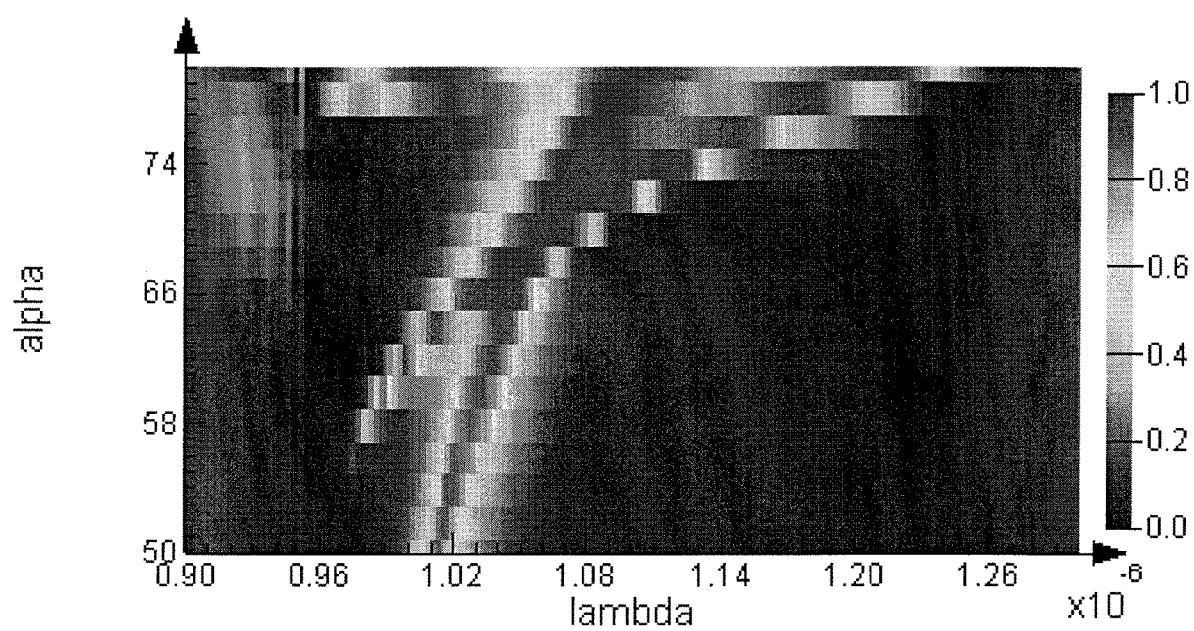
FIG. 6 is a reflectance plot of the hexagonal unit cell of dual-inverted cone structures of FIGS. 1A-1B, for varying angle alpha ($\alpha$).

An optical structure having nanostructure elements 1 in the form of inverted cones is depicted in the SEM image of FIG. 4. As shown, a uniform recreation of the nanostructure elements 1 has been formed across several millimeters of the bulk homogenous substrate.

While the nanostructure elements 1 have been described and depicted as having a dual cone structure, it is to be understood that other structures could alternatively be used to provide desired optical properties. For example, structures other than a dual cone structure can be formed that provide highly reflective optical structures. One example of such a structure is depicted in FIG. 5, which illustrates a square structure. This structure is very similar to the dual cone structures, except that the cross section of the "cones" is square rather than circular. Thus, in addition to a circular top portion 3 for the dual cone structure, square and n-sided polygon geometries may also be provided and will have a marginal effect on the reflectance as compared with circular structures. In addition, it is also possible to provide nanostructure elements 1 in which the top portion 3 and base portion 2 have differing cross-sectional profiles. For example, a base portion 2 could be provided with a square or n-sided polygon geometry, while the top portion 3 is provided with a circular top surface 8 geometry and vice-versa.

The overall spectral response effect for the exemplary embodiment shown in FIGS. 1A-1B, having a dual cone structure with a circular cross sectional profile, was demonstrated. In particular, finite difference time domain (FDTD) simulations were performed to evaluate the reflective properties of such a dual cone nanostructure element 1 structure, while sweeping all possible geometrical properties depicted in FIG. 1B. The design was optimized for a wavelength of 1064 nm, which corresponds to the emission of ND:YAG lasers. However, a simple scaling of all the dimensions can shift the operating point to higher wavelengths, such at 10.6 µm corresponding to $CO_2$ lasers. FIG.

6 shows the reflectance plot of such a structure with vertically incident laser irradiation. It was noted that there is an operating point around 1064 nm with a bandwidth of approximately 30 nm and a peak reflectivity of 1. In this case r_disc=0.25 um, h_total=3 um, pitch=1.1 um, r_sup=0.2 um, r_min=0.04 nm.

Figure 7A:
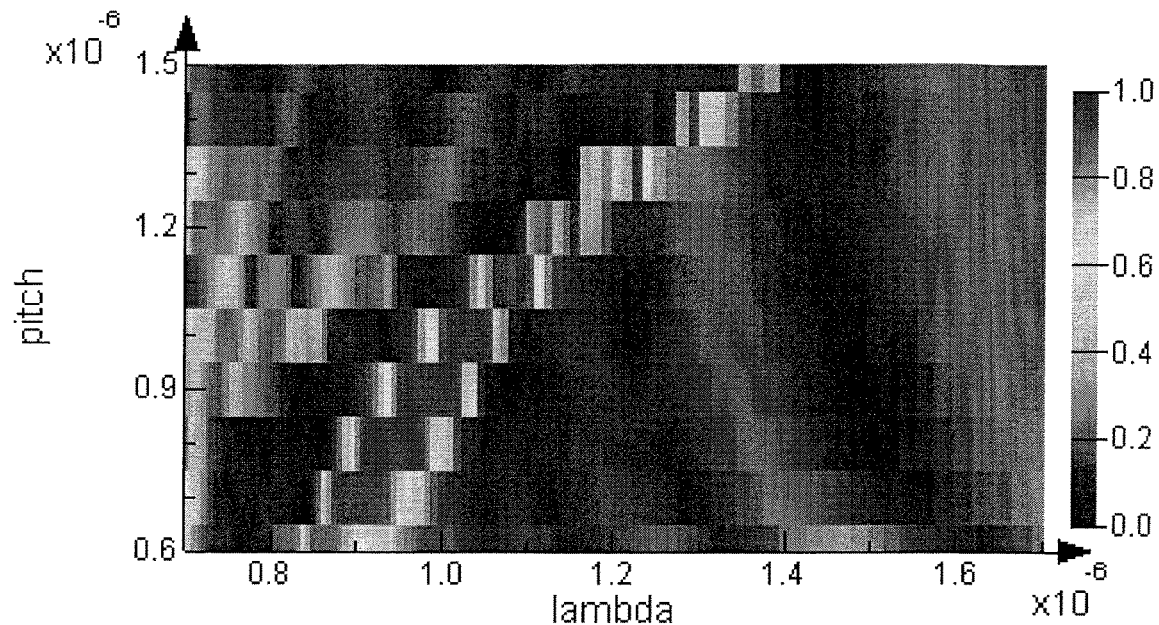
FIGS. 7A-7D are reflectance plots of the hexagonal unit cell of dual-inverted cone structures of FIGS. 1A-1B, with FIG. 7A varying the pitch of the dual-inverted cone structure, FIG. 7B varying the r_disc of the dual-inverted cone structure, FIG. 7C varying the angle alpha ($\alpha$), and FIG. 7D varying the h_total.

FIGS. 7A-7D show the reflectance plots of a similar nanostructured surface, while varying other geometries of the nanostructure elements 1 to confirm the robustness of the design and evaluate the tuning capabilities available by adjusting the physical dimensions. FIG. 7A illustrates a sweep of the pitch (which is the pitch of the top portion 3), FIG. 3B illustrates a sweep of the radius of the top surface 8 (r_disc), FIG. 3C illustrates a sweep of the angle alpha of the top portion 3, and FIG. 3D illustrates a sweep of the total height of the nanostructure elements 1 (h_total). As shown in FIG. 3C, it was confirmed that slight variations in the angle alpha do not have a severe effect on the peak reflectance position which is critical to have a robust design to fabrication tolerances. Further, the h_total plot shown in FIG. 3D also confirms that the spectral position of the reflectance is fairly insensitive to total height variations. These two measures are typically the most difficult to control within nanometer precision. Therefore, it is requisite that designs be relatively insensitive to these parameters, which was confirmed as shown in FIGS. 7A-7D. Similarly, r_sup and r_mi have negligible effect on reflectance, and slight variations in their values have insignificant consequence on the overall performance of the optical structure.

Figure 7B:
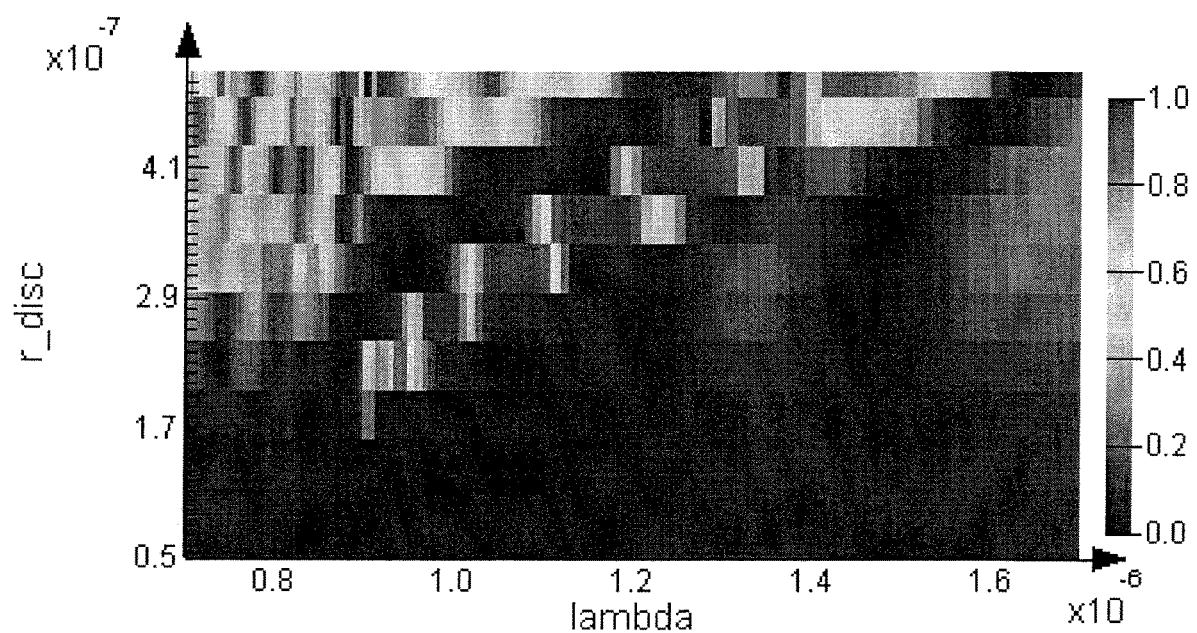
Figure 7C:
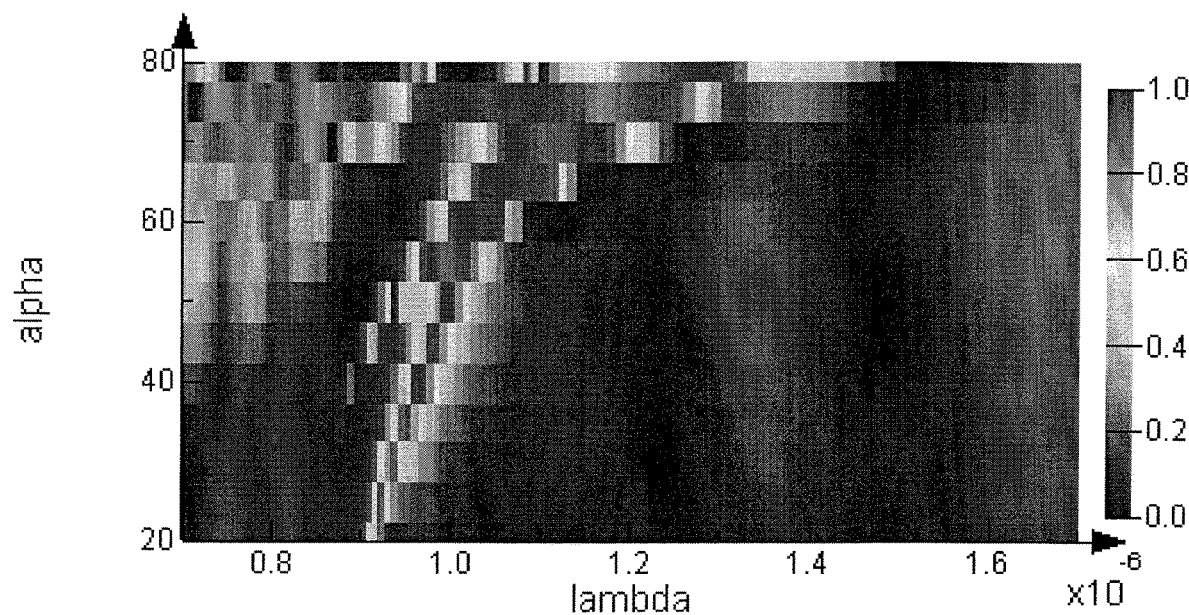
Figure 7D:
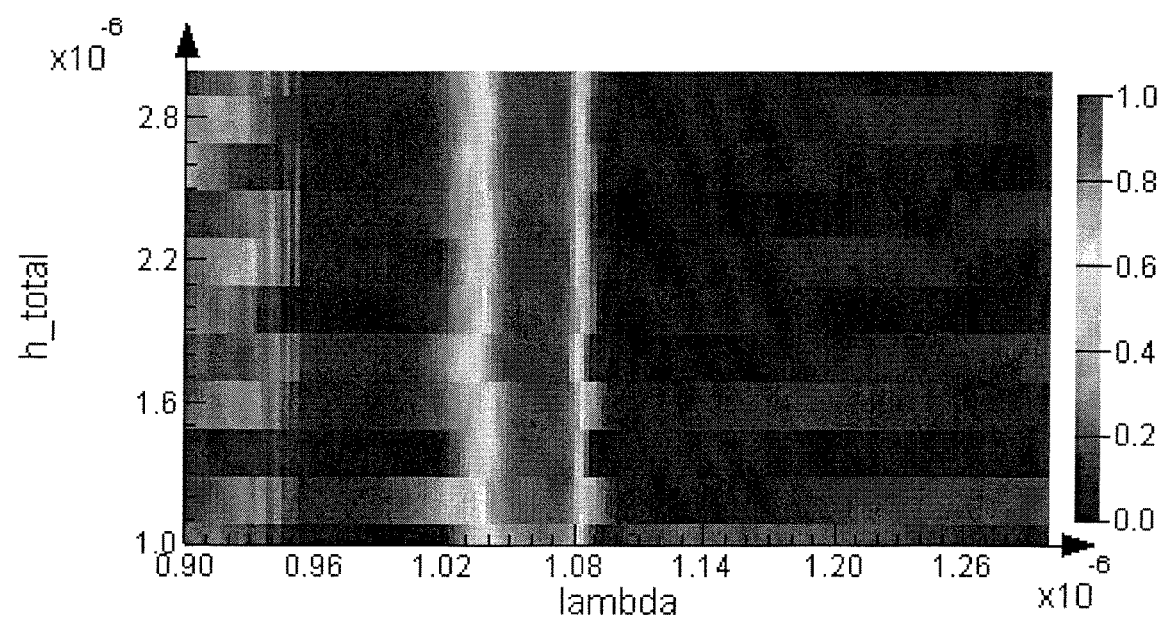

As further demonstrated in FIGS. 7A and 7B, adjustments in the pitch or the size of r_disc can significantly change the position of the peak reflectance. Since these parameters are easily controlled by the precision of tools, particularly by an electron beam lithography tool that can be utilized to fabricate these structures, a multitude of designs with varying spectral positions and bandwidths can be easily realized by adjusting these features. It was further determined that a square lattice (FIG. 2B) as opposed to a hexagonal lattice (FIG. 2A) show similar results and performance as those presented in FIGS. 7A-7D.

While the above detailed description was set forth with specific reference to use of diamond as the bulk homogenous substrate 10 material, other materials could alternatively be used. In order to provide optical structures that are suitable for use with high powered lasers, it is important to provide a material having excellent thermal conductivity. As such, any materials which have excellent thermal conductivity could be considered. In addition materials having properties comparable to diamond could also be considered. As noted, diamond has a relatively high refractive index (2.4), a wide bandgap (5.5 eV), and a large optical transmission range from the UV into the mid infrared. As such, materials which possess a high refractive index, a wide bandgap, and/or a large optical transmission range could be suitable. It is also further desirable that the material possess mechanical hardness and chemical resistance. As such, one of skill in the art could determine suitable bulk homogenous substrate materials by seeking a material that possesses one or more of these properties, taking into account the desired properties in the end optical product and how the optical product is to be used.

It will be apparent to those skilled in the art that various modifications and variations can be made to the structure of the present invention without departing from the scope or spirit of the invention.

In view of the foregoing, it is intended that the present invention cover modifications and variations of this invention provided they fall within the scope of the following claims and their equivalents.

What is claimed is:

1. An optical structure having one or more enhanced optical properties comprising:
   a bulk homogenous substrate material having an initial reflectivity;
   a plurality of nanostructure elements provided within the bulk homogenous substrate material, wherein the plurality of nanostructure elements comprise:
      a base portion extending from a surface of the bulk homogenous substrate material, the base portion having a bottom end and an upper end, the base portion (a) tapering from a wider bottom end to a narrower upper end or (b) having a rod-like configuration with a substantially constant diameter from the bottom end to the upper end; and
      a top portion extending from the upper end of the base portion, the top portion having a bottom end and an upper end, and an upper surface at the upper end the top portion upper surface having a greater area than the base portion bottom end, the bottom end of the top portion extending from the upper end of the base portion,
      the top portion having a length that extends from the upper end of the top portion to the bottom end of the top portion,
      the top portion tapering along its length from a wider upper end to a narrower bottom end, thereby providing the upper surface with increased surface area and increased reflectivity,
   wherein the bulk homogenous substrate material and the plurality of nanostructure elements are formed from a single layer of a homogenous material, and
   wherein the nanostructure elements provide the optical structure with a reflectivity that is greater than the initial reflectivity of the bulk homogenous substrate material without the nanostructure elements.

2. The optical structure of claim 1, wherein the nanostructure elements comprise a dual cone structure, wherein the base portion is in the shape of a cone with a circular cross section that decreases in size from the bottom end to the top end of the base portion, and wherein the top portion is in the shape of an inverted cone with a circular cross section that increases in size from the bottom end to the top end.

3. The optical structure of claim 1, wherein the nanostructure elements comprise a dual inverted structure, wherein the base portion is in the shape of a cone with a polygonal shaped cross section that decreases in size from the bottom end to the top end of the base portion, and wherein the top portion is in the shape of an inverted cone with a polygonal shaped cross section that increases in size from the bottom end to the top end.

4. The optical structure of claim 3, wherein the bulk homogenous substrate material is diamond.

5. The optical structure of claim 1, wherein a shape of the top portion provides a constriction immediately underneath the bottom end of the top portion.

6. The optical structure of claim 5, wherein a shape of the base portion provides a constriction immediately above the top end of the base portion.

7. The optical structure of claim 1, wherein the plurality of nanostructure elements each have a total height, the upper portion top surface has a first radius, the upper portion has a pitch and a taper angle, the upper portion has a second radius at the bottom end, and the base portion has a third radius at the bottom end, and wherein one or more of the pitch, total height, first radius, taper angle, second radius, and third radius are optimized to provide a nanostructure element with increased reflectivity at one or more selected wavelengths and bandwidths.

8. The optical structure of claim 7, wherein the pitch angle and/or first radius is optimized to provide a peak reflectance of the plurality of nanostructure elements, which is greater than the initial reflectance of bulk homogeneous substrate surface.

9. The optical structure of claim 1, wherein the pitch angle and/or first radius of the plurality of nanostructure elements is optimized to provide increased reflectivity at one or more selected wavelengths and bandwidths.

10. The optical structure of claim 1, comprising a plurality of uniform nanostructure elements.

11. The optical structure of claim 10, wherein the nanostructure elements uniformly disposed within the bulk homogenous substrate material.

12. The optical structure of claim 1, wherein the bottom end of the top portion of the nanostructure elements is narrowest of the top portion and bottom portion of the nanostructure elements in cross section.

13. The optical structure of claim 1, wherein a shape of the top portion provides a refractive index that is relatively greater than the refractive index of the base portion immediately underneath the bottom end of the top portion.

* * * * *